Aug. 6, 1929.   W. F. HARRINGTON   1,723,032
HYDRAULIC BRAKING SYSTEM
Filed June 9, 1925   4 Sheets-Sheet 2
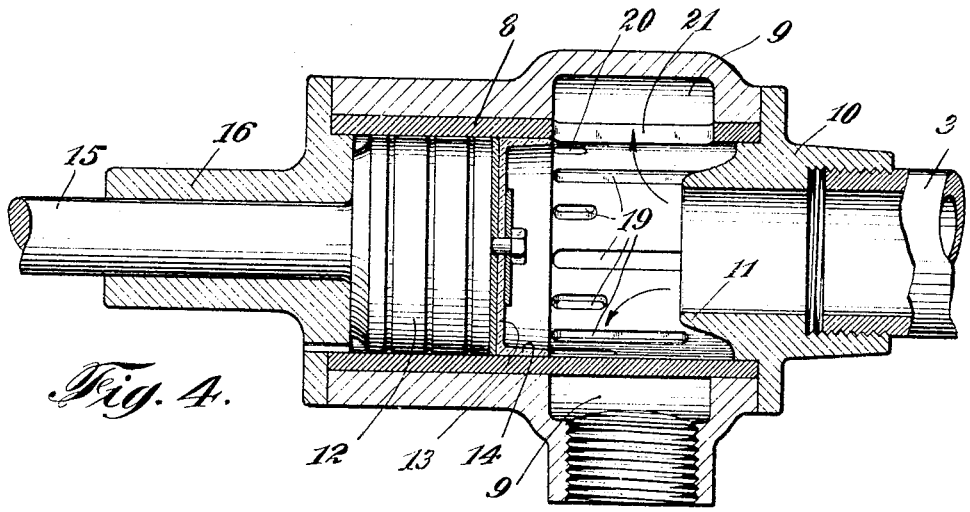
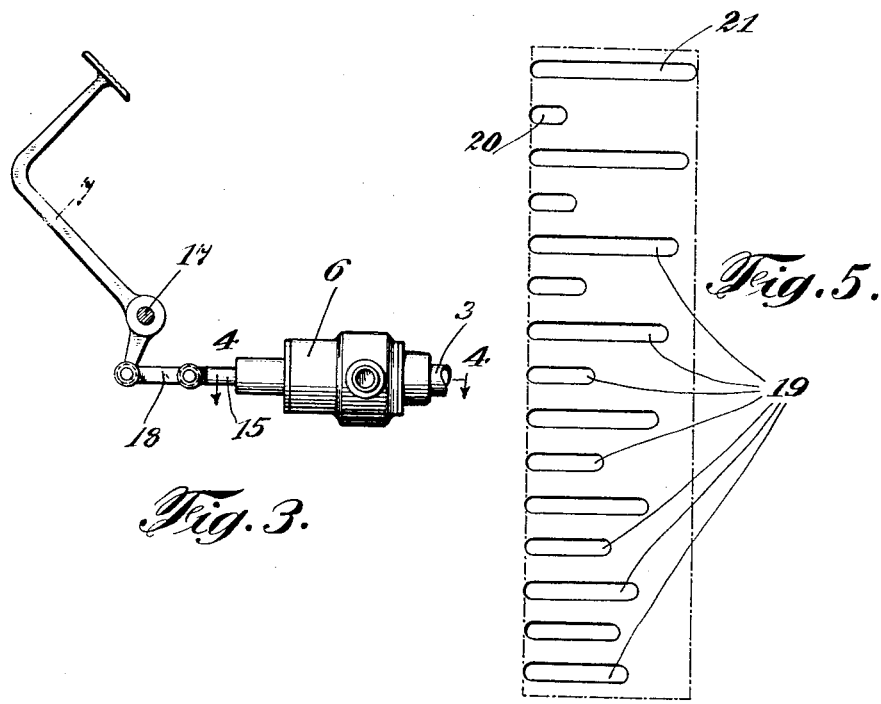
INVENTOR
W. F. Harrington
BY
ATTORNEY

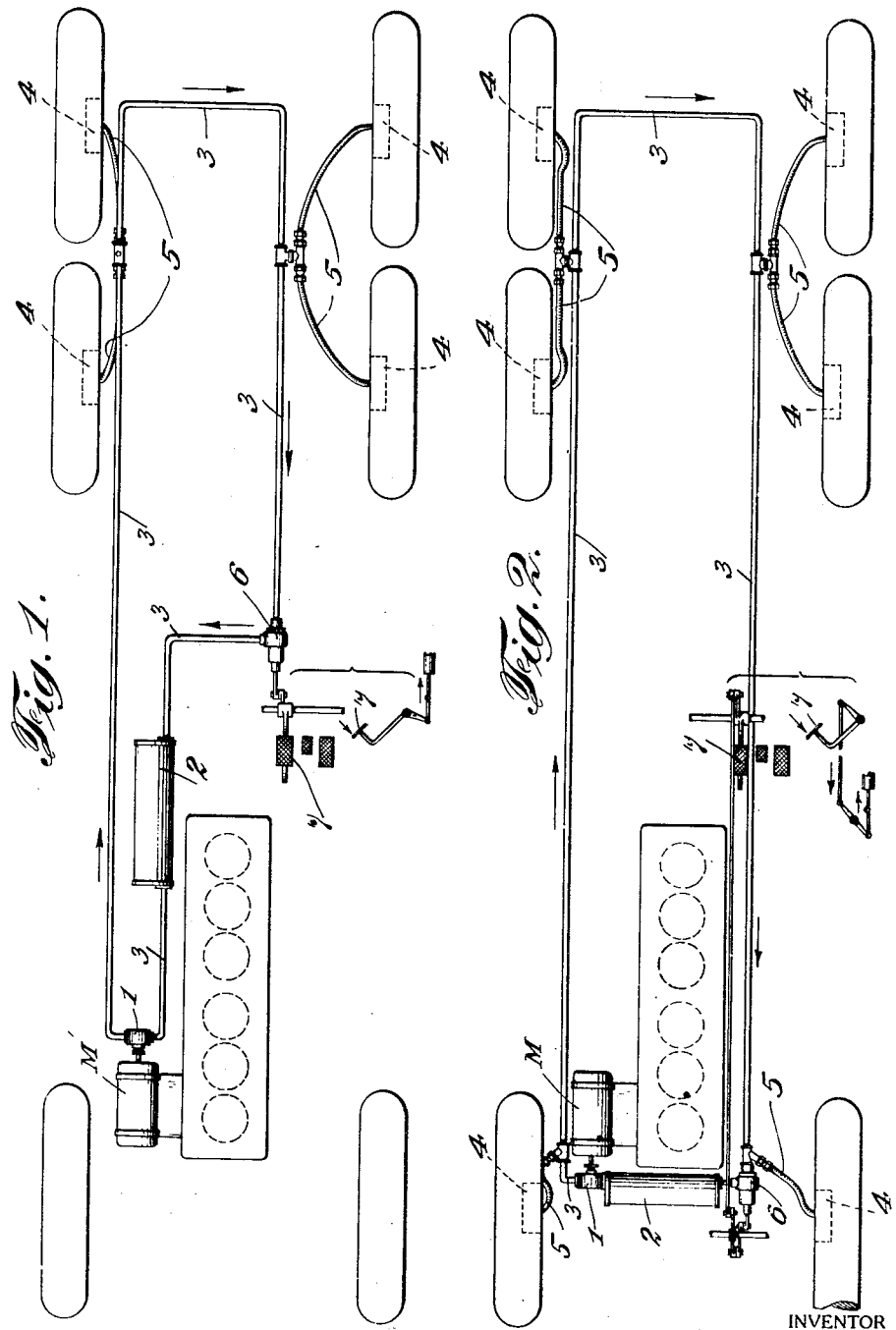

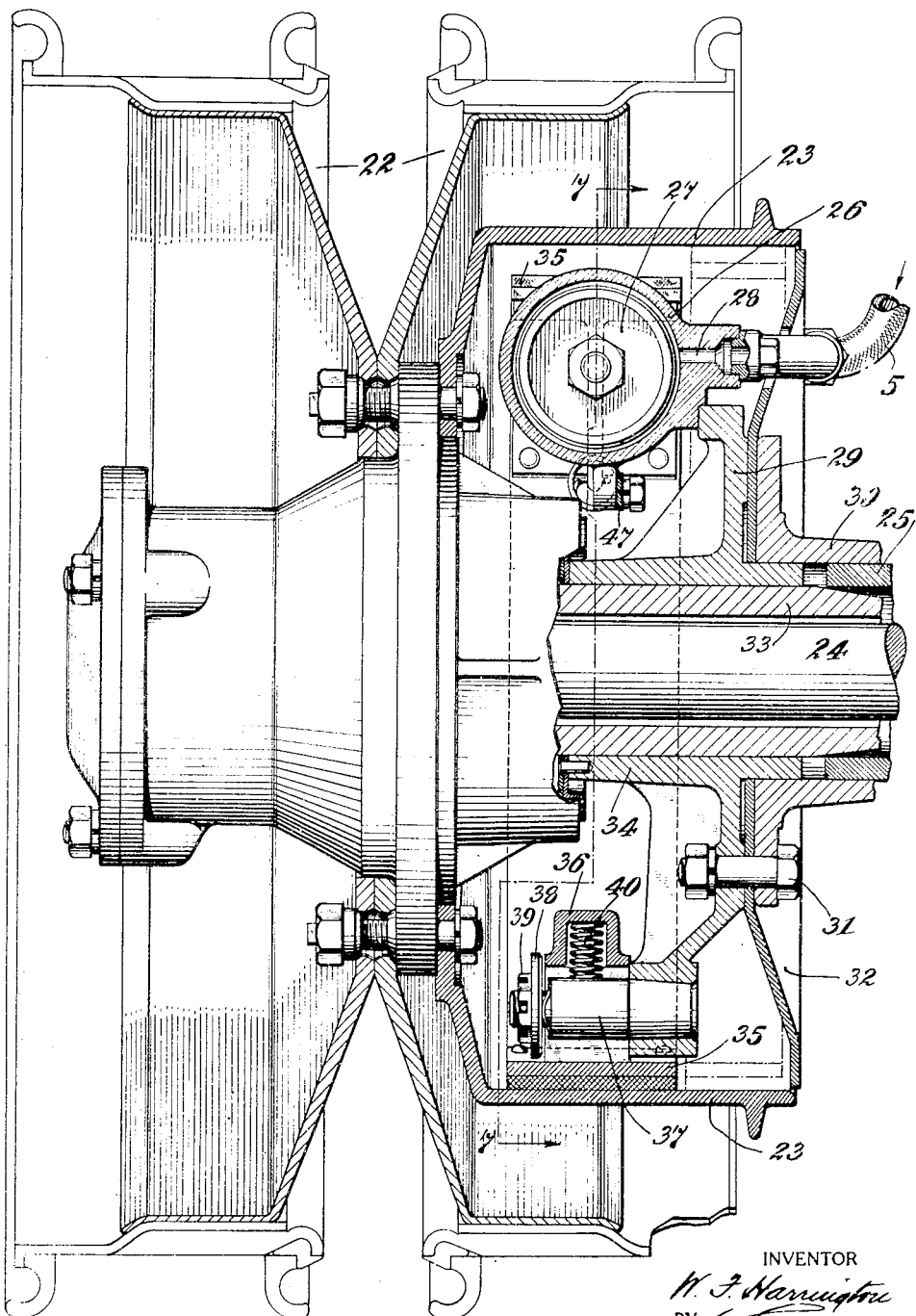

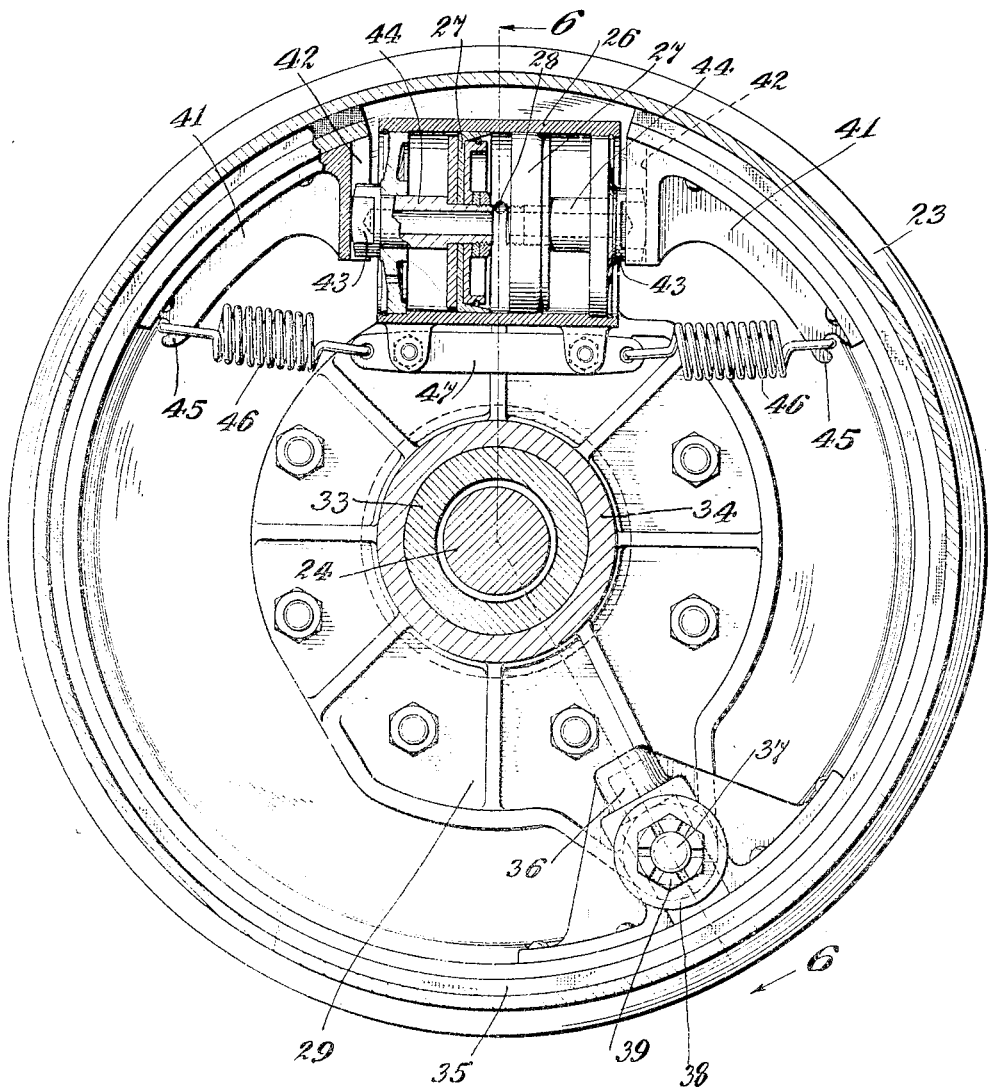

Patented Aug. 6, 1929.

1,723,032

UNITED STATES PATENT OFFICE.

WILLIAM F. HARRINGTON, OF PHILADELPHIA, PENNSYLVANIA, ASSIGNOR OF TWO-THIRDS TO HALE & KILBURN CO., OF PHILADELPHIA, PENNSYLVANIA, A CORPORATION OF DELAWARE.

HYDRAULIC BRAKING SYSTEM.

Application filed June 9, 1925. Serial No. 35,874.

This invention relates to hydraulic braking systems, and more particularly relates to hydraulic braking systems adapted for use on automotive vehicles, such as commercial and pleasure automobiles.

In addition to positive and effective braking under the control of the operator, there are other requirements and refinements which are desirable in a braking system for automotive vehicles. For instance, control and operation by means of a pedal; pedal pressure sufficiently low, so as not to tire the leg of the operator, and at the same time sensitiveness to pedal application and operation in such a way that the braking effect is directly proportional to the pedal movement and pedal pressure. The system should require no adjustment of the brakes, and it is important that the system be at all times in condition to respond instantly and positively to pedal movement to brake the vehicle or to release the brakes, and irrespective of whether the vehicle is in motion or stationary. In a hydraulic system, loss and leakage of the liquid are very objectionable, and the system should be able to operate over long periods of time without requiring replenishment of the liquid.

The principal object of my invention is to provide a hydraulic braking system having the above characteristics, refinements and advantages. Another object of my invention is to provide an improved valve mechanism suitable for use in such system. A further object of my invention is to provide an improved brake operating cylinder assembly and an improved manner of mounting and operating the same. Other objects of my invention will be in part obvious and in part pointed out hereinafter.

In accordance with my invention, I provide means for circulating a braking liquid in a closed circuit continuously when the vehicle is in use, and irrespective of whether or not the vehicle or its engine (or motor) is stationary or in motion. Thus the system is not dependent for operation on vehicle motion or on the operation of the vehicle engine. The liquid is constantly at brake operating cylinders associated with the wheels to be braked, ready to establish pressure in these cylinders instantly and proportionally in response to variations of pressure in the circulating fluid circuit. Preferably, flexible tubing in open communication with the circulating fluid circuit and the brake operating cylinders is used for this purpose. Preferably, pressure in the circuit and cylinders is developed by means of a pedal operated valve so designed that a proportion of the actual circuit pressure is transferred to the operator's foot, and to provide a sensitive control which is not tiring to the operator. Since the fluid circulates continuously, it will not have a tendency to congeal in cold weather. The fluid is drawn from and is discharged into a reserve tank, thus allowing the air in the system to separate out, and compensating for any leakage that may occur.

In order that a clearer understanding of my invention may be had, attention is hereby directed to the accompanying drawings, forming a part of this application and illustrating one possible embodiment of my invention. Referring to the drawings, Fig. 1 is a diagrammatical plan view of a hydraulic brake system embodying my invention, operating upon four rear wheels of a vehicle; Fig. 2 is a diagrammatical plan view of a braking system embodying my invention operating upon four rear wheels and two front wheels of a vehicle; Fig. 3 is an enlarged side view of a brake pedal connected with the control valve of my system; Fig. 4 is an enlarged sectional view of said valve and fragments of associated parts; Fig. 5 is a development of the port portion of the valve; Fig. 6 is a vertical sectional view, showing the manner of mounting a brake and brake operating cylinder assembly of my improved braking system within the brake drum of a vehicle wheel; and Fig. 7 is a plan view, partly in section, of the same. Similar reference characters refer to similar parts throughout the several views of the drawings.

First, referring to the system and its operation broadly, as shown best in Figs. 1 and 2, an independently driven hydraulic pump 1 sucks fluid from a reserve tank 2 and circulates the fluid through a single line of circulating pipes 3, which line preferably approaches closely to the wheels to be braked by the system. Suitable brake operating cylinders 4 are associated with each of the wheels to be braked, and are in continuous open communication with the pipes 3 through tubing 5, which is preferably flexible. In the pipe line 3, between its connection with the brake operating cylinders and the reserve tank 2, is a valve 6, which is operatively connected with a pedal 7, or other suitable device, whereby the operator may regulate the valve to determine and govern the braking effect of the braking system. Pump 1 is preferably driven by an electric motor M, continuously so long as the vehicle is in use, and irrespective of whether the vehicle is in motion or at rest. It is found desirable not to have this pump driven from the motor of the vehicle, so as not to be dependent in any respect on the engine for operation. The fluid used is preferably an oil having a viscosity cold test of 20° below zero. The valve 6 is preferably of the partially balanced piston type, and preferably so designed that a proportion of the actual pressure of the system may be transferred to the driver's foot, and will operate to open the valve as the foot pressure on the pedal is released.

From the above, the operation will be readily apparent. When the vehicle is put into use, the pump is started, and fluid is constantly circulating through the pipes 3. So long as valve 6 is fully open there is not sufficient pressure in the system to operate the brakes, but as soon as this pressure is increased, due to a partial closing of the valve 6, the pressure in the system increases and will act within the brake operating cylinders 4 to establish a braking effect on the vehicle wheels. The pressure and consequently the braking effect increase proportionally as the valve is closed. Conversely, this braking effect and pressure will decrease in proportion to the subsequent opening of the valve. Meanwhile, any air that is drawn into the fluid by any means separates out in the reserve tank 2, and thus is prevented from interfering with the operation of the system.

Referring to Figs. 3, 4 and 5, the valve 6 may include a sleeve 8, the periphery of which, adjacent one end, is provided with a series of ports, which communicate with a surrounding annular chamber 9, communicating with the pipe which leads to the reserve tank 2. The pipe which leads to this valve communicates with the interior of the sleeve 8 adjacent the port portion thereof. This communication may be had through a cap 10, which has a tapered end portion 11 disposed within the sleeve 8. A piston 12 is positioned for reciprocation in sleeve 8. Preferably, this piston is supplied with a member 13, having a forwardly directed annular flange 14 of suitable flexible material, such as leather, which is arranged to cover and uncover the valve ports in accordance with the adjustment of the piston in the valve. A rod 15 is connected to the cylinder head 12 and slides in a bearing cap 16 secured to the valve. Pedal 7 may take the form of a bell-crank, pivoted as at 17, and connected with rod 15 by means of a link 18. To provide sensitive and proportional response of the braking system to pedal operation, the ports provided in sleeve 8 preferably take the form of parallel slots 19, all aligned at the ends which are toward the piston 12. These slots are of gradually increasing length, ranging from the smallest one 20 to the longest one 21. Thus, it will be apparent that as the valve closes the initial amount of cut-off will be the greatest, and that this amount will decrease proportionally as the piston is advanced across the slots. The pressure in the fluid circuit instantly responds to the closing of the valve and the braking effect is similarly responsive. It will also be noted that fluid under pressure entering the interior of the sleeve 8 will tend to force the piston 12 outward and to restore the pedal 7 into initial position. In this way, pressure in the system is communicated directly to the foot of the operator, and that the amount of such fluid pressure against the pedal is proportional to the pressure in the fluid circuit and, consequently, also to the amount of braking effect.

Referring to Figs. 6 and 7, there is shown a wheel 22, having a brake drum 23. 24 represents the axle of the wheel, and 25 a fragment of the end of an axle housing. Within the brake drum 23 is mounted a double acting brake operating cylinder 26, having two opposed pistons 27. The fluid from the flexible tubing 5 enters the cylinder between these pistons at a suitable port 28. Cylinder 26 is supported on a suitable casting or spider 29, which is secured to an attachment sleeve 30, as by means of bolts 31. Sleeve 30 is secured to and supported by the axle housing 25. Preferably, a cover plate 32 is secured in place between members 29 and 30 to keep dust and dirt away from the brakes and the operating mechanism. 33 is a bushing sleeve interposed between the sleeve portion 34 of member 29 and the axle 24. A circular expansible brake band 35 of suitable material is disposed within the drum 23 closely adjacent the inner surface thereof, and is supported at one point on the spider 29 so as to be slidable in respect thereto. This mounting comprises a yoke 36, which is secured to the brake band 35, and is slidable on a pin or stud 37 secured to the spider 29, being confined on the one side by the member 29 and on the other side by a washer 38 and nut 39 which are secured on the end of the stud 37. A spring 40 is confined between the top of the yoke 36 and the stud 37 to yieldingly urge the yoke upwardly, and thus draw the brake band 35 away from the drum 23. The brake band 35 is split, and the brake operating cylinder 26 is preferably located at the split and between the ends of the band 35. At each end the band is provided with a member 41, which is provided with a recess 42, in which is disposed a head 43 carried on the end of a stem 44, which is connected with one of the piston heads 27. Preferably, the sides of each head 43 are straight to fit against the straight walls of the recess 42. At its opposite end, each member 41 is provided with a hook 45, which is engaged by one end of a spring 46. The other end of each spring 46 is secured to a bar 47, or similar device, secured to the cylinder 26, whereby these springs constantly tend to draw the brake band 35 away from the brake drum 23.

The operation will be readily apparent. As fluid under pressure enters the cylinder 26 at the port 28, the fluid will exert pressure against the pistons 27, tending to force both of them outwardly. This movement of the pistons will expand the brake band 35 against the brake drum 23, and due to the slidable mounting of the band on the stud 37, the band will tend to expand against the drum along its entire periphery. As the pressure within the cylinder 26 increases, the braking effect of the band 35 against the brake drum 23 will be increased. When the pressure within the cylinder 26 is relieved, the springs 46 and the spring 40 will tend to contract the brake band and thus take it out of braking engagement with the brake drum 23. If desired, brake band 35 may include a band of resilient material and thus have an inherent tendency to assume collapsed position, in which there will be no braking effect.

It is to be understood that my braking system is not limted to the employment of a valve or brake operating cylinder of the specific types above described, since many other types of valves and brake operating cylinders may be employed in my improved system, and the application of the system is not limited to six wheel vehicles.

It is also to be understood that the valve 6 may be operated by a hand lever instead of a foot pedal, if desired. Also that, if desired, a connection may be made whereby the valve is responsive not only to a brake pedal, but also to a clutch pedal of the vehicle. Any suitable means may be provided for releasably locking any element used for the operation of the valve in any adjusted position. Also, if desired, a supplementary spring or other means may be provided for restoring the valve and any valve operating member therefor into releasing position, as and when it is released by the operator.

It will be readily apparent from the above that the system is not subject to leaks of fluid and, therefore, does not require frequent replenishment of the fluid. It will also be noted that the system is highly responsive to pedal pressure, does not require adjustment of the brakes, and, in fact, is endowed with all the requirements and refinements mentioned heretofore.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

In a hydraulic braking system for vehicles equipped with propulsion means, in combination, brakes, and hydraulic means operating independently of vehicle motion and independently of the vehicle propulsion means for setting said brakes, said hydraulic means including a fluid circulating circuit, means driven independently of vehicle motion and independently of the vehicle propulsion means for circulating fluid through said circuit continuously, brake operating cylinders, flexible tube connections between said circuits and said brake operating cylinders, valve means under manual control for gradually intercepting the fluid flow in said circuit and tube connections as the valve means is applied to operate said brakes accordingly, and a foot member connected to said valve means in such a manner that slight changes in the interception of the fluid flow and the corresponding application of the brakes will be made evident to the operator.

This specification signed this fifth day of June, 1925.

WILLIAM F. HARRINGTON.